United States Patent
Chhuor et al.

(10) Patent No.: US 10,109,323 B2
(45) Date of Patent: Oct. 23, 2018

(54) DISALLOWING DISENGAGEMENT OF A DRIVE COMPONENT

(71) Applicant: LENOVO Enterprise Solutions (Singapore) PTE. LTD., New Tech Park (SG)

(72) Inventors: Chekim Chhuor, Shanghai (CN); Liying Jin, ShangHai (CN); Ping Ping Zhao, Shanghai (CN); Yu Yu, Shanghai (CN)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 15/604,443

(22) Filed: May 24, 2017

(65) Prior Publication Data
US 2017/0345462 A1 Nov. 30, 2017

(30) Foreign Application Priority Data
Aug. 31, 2016 (CN) .......................... 2016 1 0798255

(51) Int. Cl.
*G11B 33/10* (2006.01)
*G08B 5/36* (2006.01)
*G11B 33/12* (2006.01)

(52) U.S. Cl.
CPC ............... *G11B 33/10* (2013.01); *G08B 5/36* (2013.01); *G11B 33/128* (2013.01)

(58) Field of Classification Search
CPC ...... G11B 33/10; G11B 2220/415; G08B 5/36
USPC .......................................................... 340/540
See application file for complete search history.

(56) References Cited

U.S. PATENT DOCUMENTS

| | | | |
|---|---|---|---|
| 8,971,036 B1* | 3/2015 | Lau ........................... | G06F 1/20 361/679.34 |
| 9,734,873 B1* | 8/2017 | Chien .................. | G11B 33/022 |
| 9,798,534 B1* | 10/2017 | Yi ............................. | G06F 8/65 |
| 2014/0169145 A1* | 6/2014 | Bunker .................. | G11B 33/10 369/13.24 |
| 2014/0244927 A1* | 8/2014 | Goldberg .............. | G06F 3/0689 711/114 |
| 2014/0317347 A1* | 10/2014 | Aida .................. | G11B 20/1889 711/114 |
| 2014/0331009 A1* | 11/2014 | Parsonese ............... | G06F 21/80 711/115 |
| 2016/0132258 A1* | 5/2016 | Joshi ..................... | G06F 3/0619 711/114 |

(Continued)

Primary Examiner — Hirdepal Singh
(74) Attorney, Agent, or Firm — Kunzler, P.C.

(57) ABSTRACT

A method of controlling a computing device includes detecting a user input request to disengage a drive component from a computing device, the computing device comprising a multiple-drive storage system having a plurality of drive components forming a single logical unit, and determining whether or not disengaging the drive component would cause failure of the multiple-drive storage system. The method includes disallowing disengagement of the drive component from the computing device in response to determining that disengaging the drive component would cause failure of the multiple-drive storage system, and allowing disengagement of the drive component from the computing device in response to determining that disengaging the drive component would not cause failure of the multiple-drive storage system.

17 Claims, 12 Drawing Sheets

(56) References Cited

U.S. PATENT DOCUMENTS

| | | | |
|---|---|---|---|
| 2017/0075762 A1* | 3/2017 | Hendrickson | G06F 3/0619 |
| 2017/0090896 A1* | 3/2017 | Lin | G06F 8/61 |
| 2017/0171203 A1* | 6/2017 | Barajas Gonzalez | H04L 63/10 |
| 2017/0185312 A1* | 6/2017 | Smith | G06F 3/0608 |

* cited by examiner

| Level | Description | Minimum number of drives | Space Efficiency | Fault Tolerance | Array Failure Rate | Read Performance | Write Performance |
|---|---|---|---|---|---|---|---|
| RAID 0 | Block-level striping without parity or mirroring | 2 | 1 | None | $1-(1-r)^n$ | $n^x$ | $n^x$ |
| RAID 1 | Mirroring without parity or striping | 2 | $\frac{1}{n}$ | $n-1$ drive failures | $r^n$ | $n^x$ | $1^x$ |
| RAID 2 | Bit-level striping with Hamming code for error correction | 3 | $1-(1/n)\log_2(n-1)$ | One drive failure | Depends | Depends | Depends |
| RAID 3 | Byte-level striping with dedicated parity | 3 | $1-(1/n)$ | One drive failure | $1-(1-r)^n - nr(1-r)^{n-1}$ | $(n-1)^x$ | $(n-1)^x$ |
| RAID 4 | Block-level striping with dedicated parity | 3 | $1-(1/n)$ | One drive failure | $1-(1-r)^n - nr(1-r)^{n-1}$ | $(n-1)^x$ | $(n-1)^x$ |
| RAID 5 | Block-level striping with distributed parity | 3 | $1-(1/n)$ | One drive failure | $1-(1-r)^n - nr(1-r)^{n-1}$ | $n^x$ | $(n-1)^x$ |
| RAID 6 | Block-level striping with double distributed parity | 4 | $1-(2/n)$ | Two drive failures | $1-(1-r)^n - nr(1-r)^{n-1} -(n/2)r^2(1-r)^{n-2}$ | $n^x$ | $(n-2)^x$ |

FIG. 2

DISALLOWING DISENGAGEMENT OF A DRIVE COMPONENT

CROSS-REFERENCE TO RELATED APPLICATIONS

This patent application claims priority to Chinese Patent Application No. CN 201610798255.6 filed on May 24, 2016 for Chekim Chhuor, et al., the entire contents of which are incorporated herein by reference for all purposes.

FIELD

The present application relates to a controller and a method of controlling a computing device. In particular, there is provided a controller and a method of controlling a computing device which has a multiple-drive storage system.

BACKGROUND

Hard disk drives (HDD) are one of the most common failure-prone components in data center devices. Computing devices such as computer servers or data storage servers employ storage virtualization technology such as multiple-drive storage systems to improve performance and functionality of data storage systems. As shown in FIG. 1, a server 1 may comprise a multiple-drive storage system having a plurality of hard disk drives 10 which appears as a single logical unit to the Operating System ("OS") of the server 1. For example, the plurality of hard disk drives 10 may be joined to form a single redundant array of independent disks ("RAID") to protect the servers from data loss when one or more drives fail by providing data redundancy. There are different levels of RAID with various characteristics and specifications. FIG. 2 shows a table illustrating examples of standard levels of RAID and the highlighted column provides the associated fault tolerance of the RAID for each RAID level.

Typically, enterprise servers allow hot swapping (i.e. replacement) of hard drives without impacting upon server operation. Current designs allow any hard disk drive to be pulled out at any time by a user. However, with a large number of hard drives in a server, complex RAID levels and the use of global hot spare drives, it may be very difficult for the user to tell which and/or when a drive can be pulled out safely, without compromising integrity of the RAID array and/or the data. Often, if a wrong disk drive is removed from the server and/or at the wrong time, damaging consequences such as failure of entire RAID array and irreversible data loss may result.

Therefore, it is desirable to provide an improved method of controlling a computing device which has a multiple-drive storage system and a controller for controlling such a computing device.

BRIEF SUMMARY

According to a first aspect, there is provided a method of controlling a computing device. The method of includes detecting a user input request to disengage a drive component from a computing device, the computing device comprising a multiple-drive storage system having a plurality of drive components forming a single logical unit, and determining whether or not disengaging the drive component would cause failure of the multiple-drive storage system. The method includes disallowing disengagement of the drive component from the computing device in response to determining that disengaging the drive component would cause failure of the multiple-drive storage system, and allowing disengagement of the drive component from the computing device in response to determining that disengaging the drive component would not cause failure of the multiple-drive storage system.

According to a second aspect, there is provided a controller configured to control a computing device. The controller is configured to detect user input request to disengage a drive component from a computing device, where the computing device includes a multiple-drive storage system having a plurality of drive components forming a single logical unit, and to determine whether or not disengaging the drive component would cause failure of the multiple-drive storage system. The controller is configured to disallow disengagement of the drive component from the computing device in response to determining that disengaging the drive component would cause failure of the multiple-drive storage system, and allow disengagement of the drive component from the computing device otherwise in response to determining that disengaging the drive component would not cause failure of the multiple-drive storage system.

According to a further aspect, there is provided a computing device. The computing device includes a multiple drive storage system having a plurality of drive components forming a single logical unit and a processor configured to detect user input request to disengage a drive component from a computing device, and to determine whether or not disengaging the drive component would cause failure of the multiple-drive storage system. The processor is configured to disallow disengagement of the drive component from the computing device in response to determining that disengaging the drive component would cause failure of the multiple-drive storage system, and to allow disengagement of the drive component from the computing device in response to determining that disengaging the drive component would not cause failure of the multiple-drive storage system.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2 is a table illustrating examples of standard levels of RAID schemes and the associated hard-disk fault tolerance for the respective RAID level;

DETAILED DESCRIPTION

Figure 1:
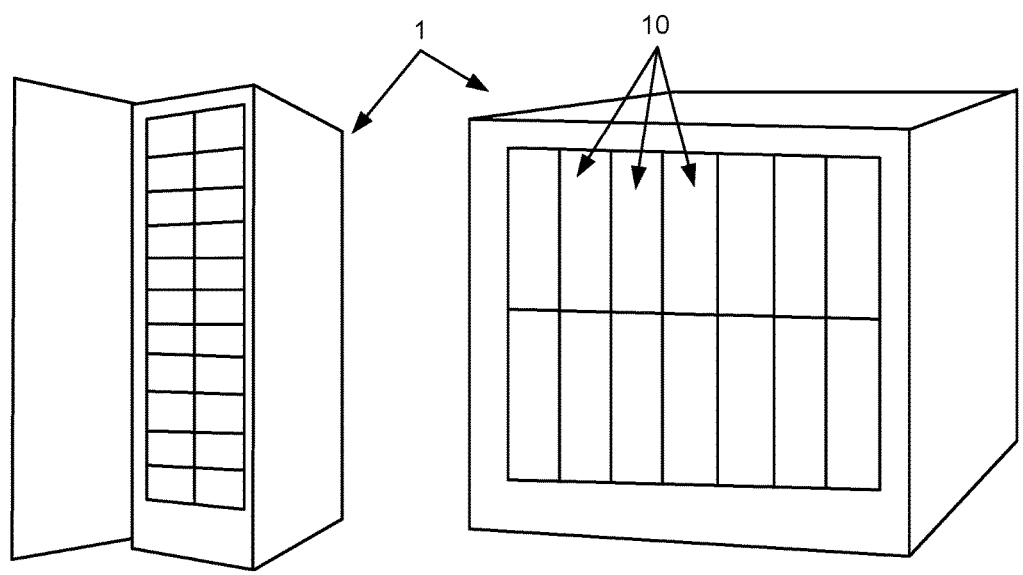
FIG. 1 is a schematic block diagram illustrating one embodiment of servers which include a multiple-drive storage system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or "Flash memory"), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

According to a first aspect, there is provided a method of controlling a computing device. The method of includes detecting a user input request to disengage a drive component from a computing device, the computing device comprising a multiple-drive storage system having a plurality of drive components forming a single logical unit, and determining whether or not disengaging the drive component would cause failure of the multiple-drive storage system. The method includes disallowing disengagement of the drive component from the computing device in response to determining that disengaging the drive component would cause failure of the multiple-drive storage system, and allowing disengagement of the drive component from the computing device in response to determining that disengaging the drive component would not cause failure of the multiple-drive storage system.

In one embodiment, the method includes detecting a working state of the drive component and using the working state of the drive component to determine if disengaging the drive component would cause failure of the multiple-drive storage system. In another embodiment, the working state of the drive component is indicative of the drive component being in at least one of the following conditions: (i) healthy, (ii) faulty, and (iii) during data reconstruction. In another embodiment, the step of determining if disengaging the drive component would cause failure of the multiple-drive storage system includes determining a fault tolerance state of the multiple-drive storage system. In another embodiment, the step of determining if disengaging the drive component would cause failure of the multiple-drive storage system includes determining if the drive component belongs to the plurality of drive components of the multiple-drive storage system, and the method also includes disengaging the drive component from the computing device if the determination is negative. In another embodiment, the method includes activating visual indicator units of the respective drive components of the plurality of drive components of multiple-drive storage system.

In one embodiment, the computer device includes a plurality of multiple-drive storage systems. Each multiple-drive storage system includes a plurality of drive components forming a single logical unit, and the method includes determining if the drive component belongs to the plurality of drive components of any said multiple-drive storage system, and disengaging the drive component from the computing device in response to determining that the drive component does not belong to the plurality of drive components of any said multiple-drive storage system. In another embodiment, the computing device includes a locking mechanism configured to secure engagement between the drive component and the computing device, where allowing disengagement of the drive component from the computing device includes disabling the locking mechanism.

In one embodiment, the drive component includes a visual indicator unit, and the method includes activating the visual indicator unit of the drive component. In another embodiment, the method includes causing a first visual indicator of the visual indicator unit to be displayed in response to disengagement of the drive component being allowed, and causing a second visual indicator of the visual indicator unit to be displayed in response to disengagement of the drive component being disallowed. In another embodiment, the multiple-drive storage system is a redundant array of independent disks ("RAID"). In another embodiment, obtaining RAID data from a RAID controller, where RAID data includes a working state for each drive component of the RAID and a RAID level, and determining an array redundancy of the RAID based on the RAID data. In another embodiment, the method is implemented by a software application configured to run on an operating system of the computing device.

According to a second aspect, there is provided a controller configured to control a computing device. The controller is configured to detect user input request to disengage a drive component from a computing device, where the computing device includes a multiple-drive storage system having a plurality of drive components forming a single logical unit, and to determine whether or not disengaging the drive component would cause failure of the multiple-drive storage system. The controller is configured to disallow disengagement of the drive component from the computing device in response to determining that disengaging the drive component would cause failure of the multiple-drive storage system, and allow disengagement of the drive component from the computing device otherwise in response to determining that disengaging the drive component would not cause failure of the multiple-drive storage system.

In one embodiment, the controller is a baseboard management controller ("BMC") of the computing device. In another embodiment, the multiple-drive storage system is a redundant array of independent disks ("RAID") and the controller is a RAID controller. In another embodiment, the controller is further configured to determine a fault tolerance state of the multiple-drive storage system.

According to a further aspect, there is provided a computing device. The computing device includes a multiple drive storage system having a plurality of drive components forming a single logical unit and a processor configured to detect user input request to disengage a drive component from a computing device, and to determine whether or not disengaging the drive component would cause failure of the multiple-drive storage system. The processor is configured to disallow disengagement of the drive component from the computing device in response to determining that disengaging the drive component would cause failure of the multiple-drive storage system, and to allow disengagement of the drive component from the computing device in response to determining that disengaging the drive component would not cause failure of the multiple-drive storage system.

In one embodiment, the multiple-drive storage system is a redundant array of independent disks ("RAID"). In another embodiment, the plurality of drive components includes a visual indicator unit configured display visual indicators to identify the drive component as belonging to the plurality of drive components of the multiple-drive storage system.

Note that the present disclosure (be it the software implementation or the hardware controller) provides non-abstract improvements to computer technology. For example, it improves the computer functionality in protecting the integrity of the storage system of the computing device and the stored data.

An exemplary method 100 of controlling a server 1a, see FIG. 7A, having a multiple-drive storage system will now be described with reference to FIGS. 3 and 4A-4D. A multiple-drive storage system refers to a data storage virtualization scheme which employs a plurality of drive components to form a single logical unit (typically, but may not always be, for data redundancy). An example of such a multiple-drive storage system is a redundant array of independent disks ("RAID"). As will be understood by a skilled person, the multiple-drive storage system may be in another form such as one employing logical volume management or a database application (which is typically non-OS level), a thin provisioning file system or the like, and is not limited to a RAID. For the sake of explanation only, the embodiments below will be illustrated with reference to a server which has a RAID, but it will be understood by a skilled person that the server may have any other storage multiple-drive storage system alternative to and/or in addition to the RAID.

Figure 3:
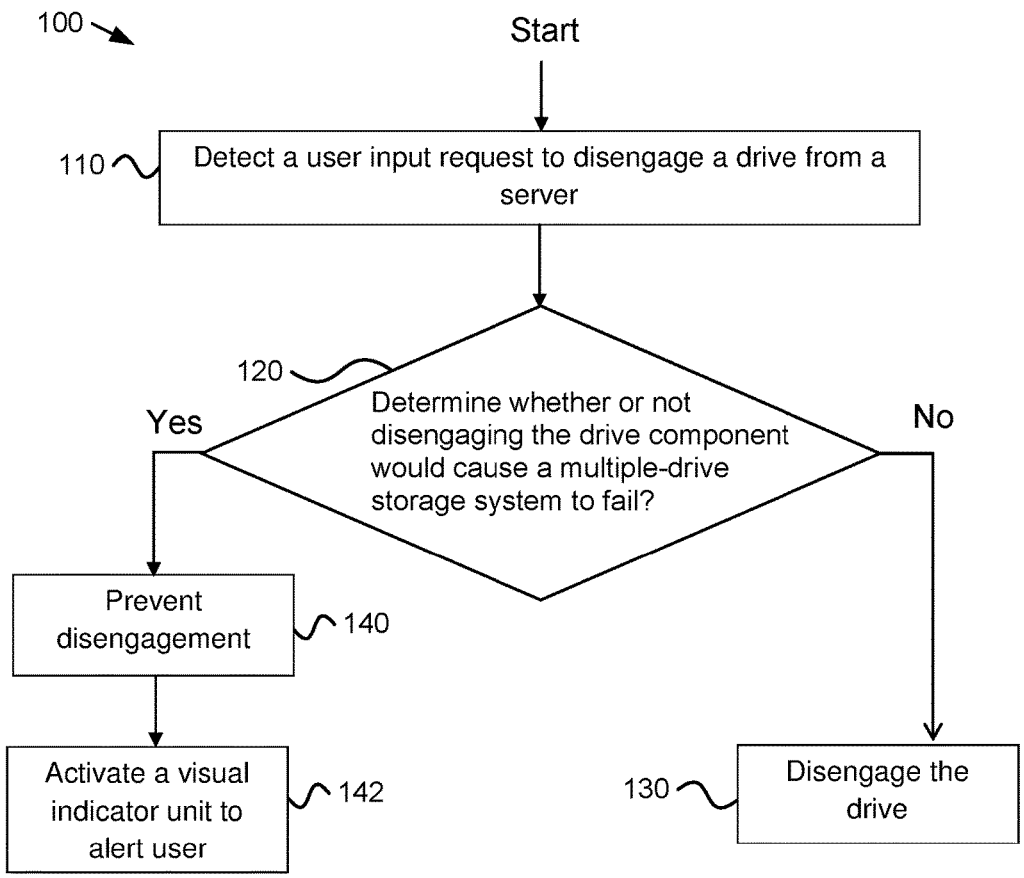
FIG. 3 is a schematic flow chart diagram illustrating one embodiment of a method for controlling unlocking of a computing device.

Referring to FIG. 3, the method 100 may be initiated (typically automatically triggered) in response to a user's request to disengage a hard disk drive ("HDD") 10 from the server 1a. For the sake of clarity and ease of illustration, the steps below are enumerated. It will be understood by a skilled person that the method may not need to be performed in the order implied by the enumerations.

Figure 4A:
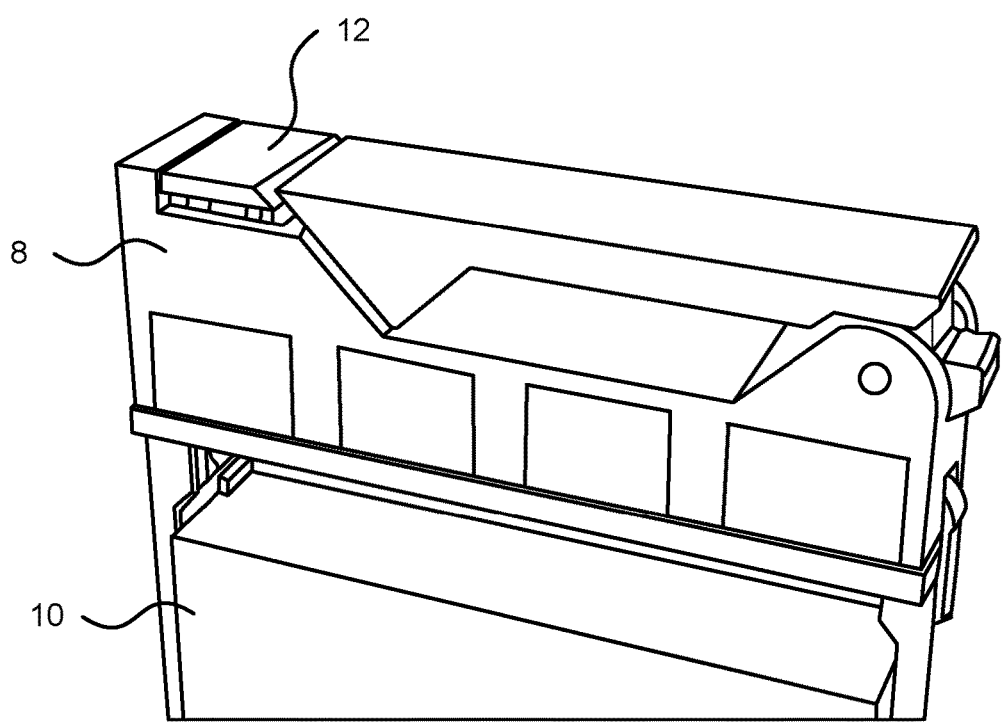
FIG. 4A is a schematic block diagram illustrating one embodiment of a hard disk drive carrier with a locking mechanism.
Figure 4B:
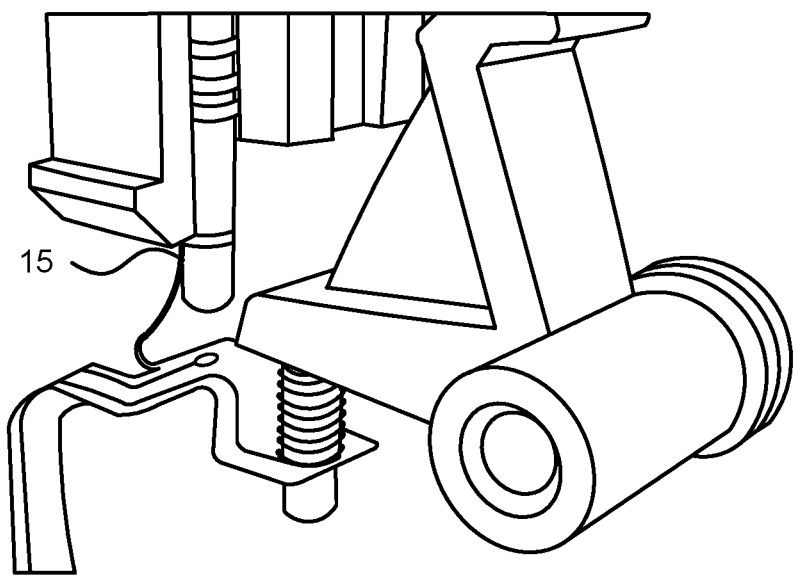
FIG. 4B is a schematic block diagram illustrating a partial view of the locking mechanism of the hard disk drive carrier depicted in FIG. 4A.

In this embodiment, the server 1a comprises a hard disk drive carrier 8 for carrying the HDD 10, as shown in FIG. 4A. The carrier 8 has a locking mechanism in a form of a latch 14 configured to maintain engagement between the HDD 10 and the server 1a, the locking mechanism may be selectively enabled or disabled to prevent or allow disengagement of the HDD 10 from the server 1a. The user's request may be in a form of an actuation of a button on a carrier handle of the HDD 10, for example, an ejection button 12 which may be mechanically coupled to the latch 14 for conditional ejection of the HDD 10, as shown in FIGS. 4A-4D. In particular, the actuation of the mechanical button 12 is detected by a controller of the server 1a at step 110.

In a variant embodiment, the button may be a "soft" button on carrier handle of the HDD 10 which digitally transmits a signal indicative of a user's request to disengage the HDD 10 to the controller. It is also envisaged that the user's request may be registered by a user's input via the server's OS.

Figure 4C:
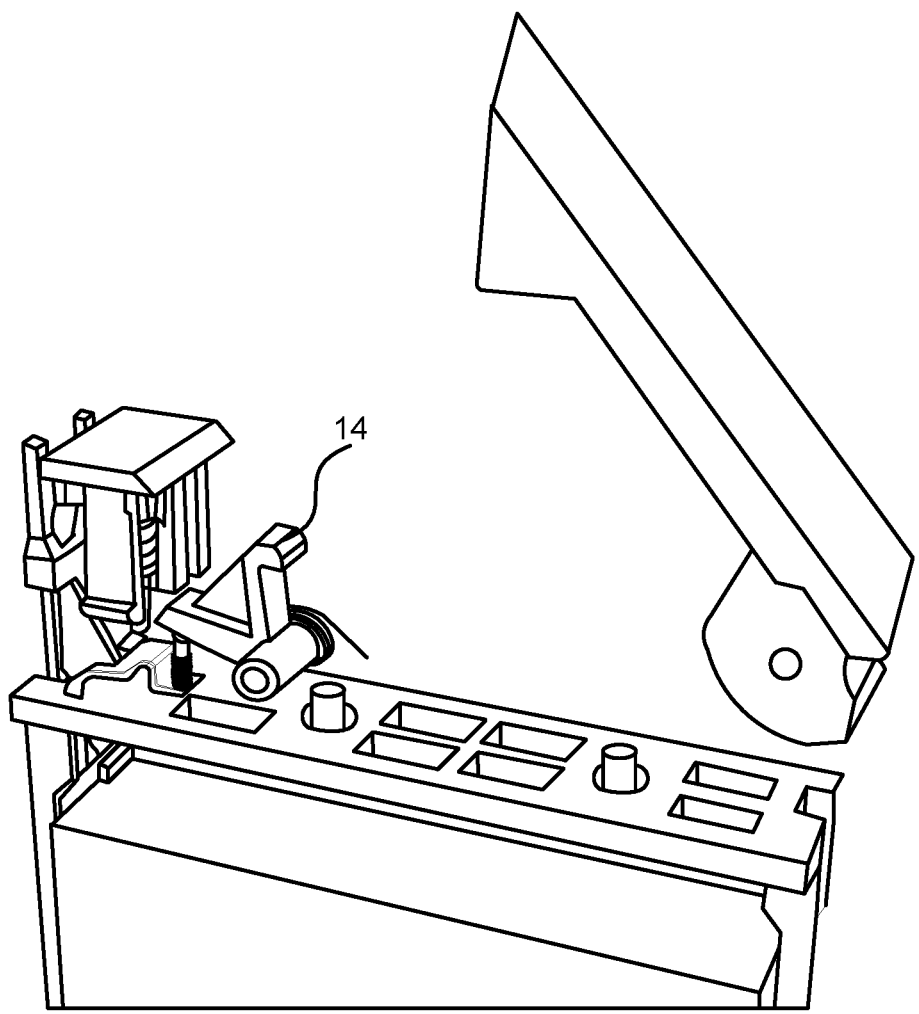
FIG. 4C is a schematic block diagram illustrating a second partial view of the locking mechanism of the hard disk drive carrier depicted in FIG. 4A with a lock in a closed position.
Figure 4D:
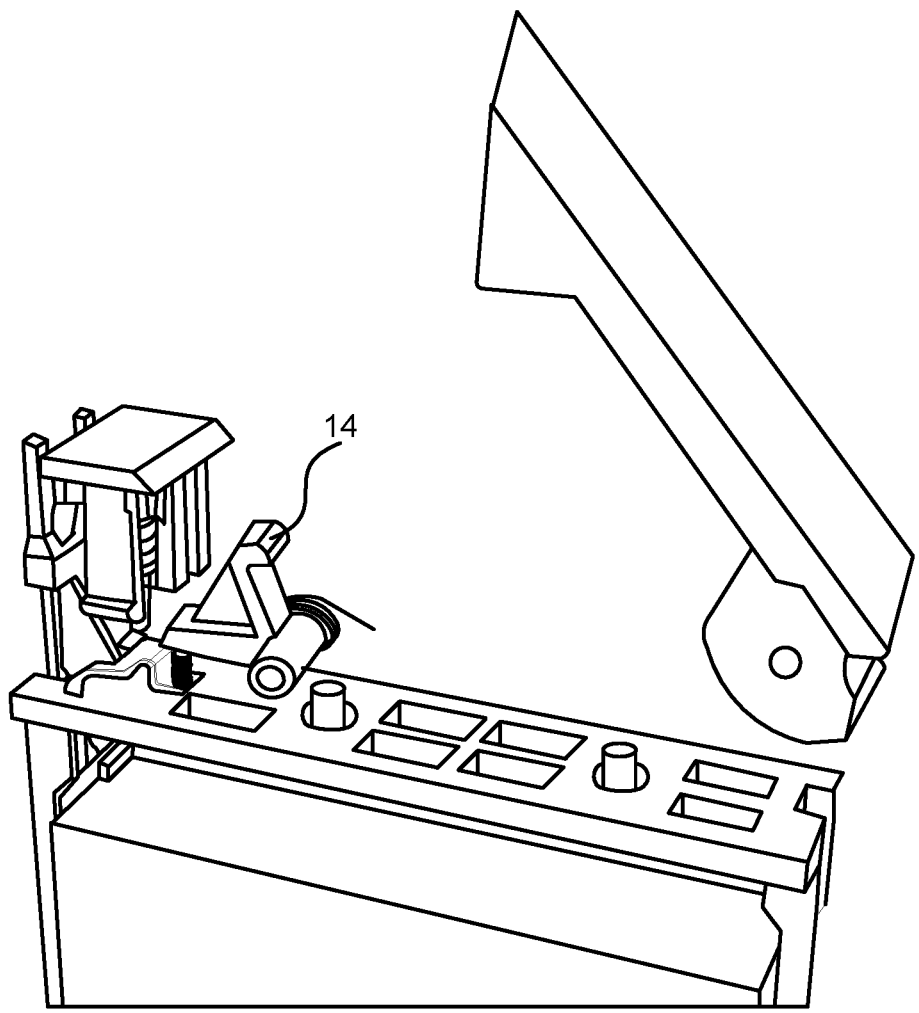
FIG. 4D is a schematic block diagram illustrating a second partial view of the locking mechanism of the hard disk drive carrier depicted in FIG. 4A with a lock in an open position.

At step 120, the controller of the server 1a uses a control algorithm (which is described in more detail in the next embodiments) to determine whether or not disengaging the HDD 10 would cause the RAID to fail. If the outcome of the determination is negative (i.e. the RAID would not fail), the controller grants the request to disengage the HDD 10. At step 130, the controller generates a corresponding control signal to allow the HDD to be disengaged. For example, the control signal causes the latch 14 to be released thereby ejecting the HDD 10 automatically, as shown in FIG. 4D. For example, an actuator may pull the latch 14 to a position to eject the HDD 10.

If the outcome of the determination is positive (i.e. the RAID would fail), the controller denies the request for disengaging the HDD 10 at step 140. In this case, the latch 14 remains disabled to secure HDD 10 in place as shown in FIG. 4C. For example, an actuator is in a non-powered state causing the latch 10 to maintain the HDD 10 engaged. It will be understood that other locking mechanism may be used alternative to or in addition to the latch 14. Optionally, a visual indication, such as a red LED light signal, may be generated to alert the user that the request for disengaging the HDD 10 is denied to preserve data integrity.

Figure 5:
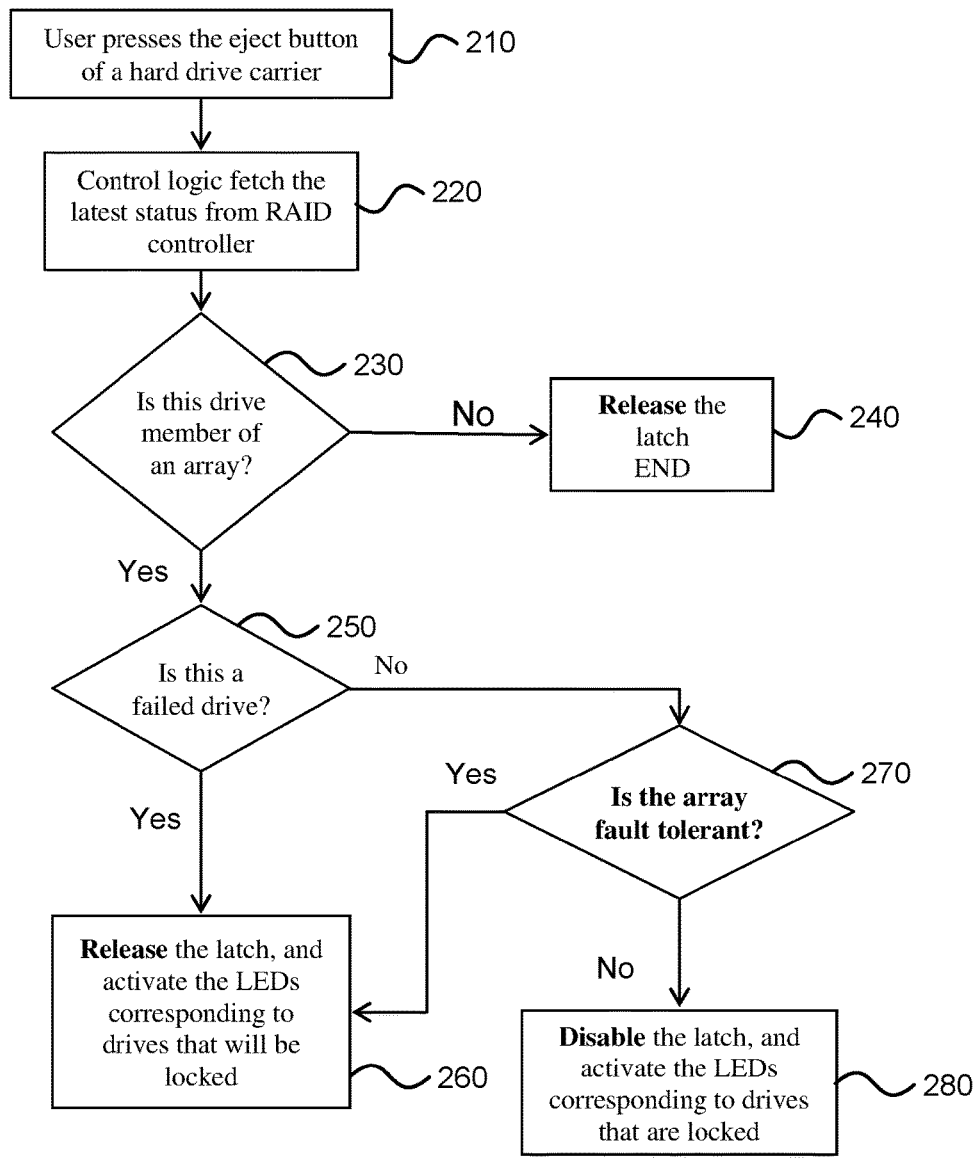
FIG. 5 is a schematic flow chart diagram illustrating another embodiment of a method for controlling unlocking of a computing device.

Turning to FIG. 5, a method 200 according to another embodiment is illustrated. In this example, the server has a level 5 RAID (i.e. RAID 5). For the sake of clarity and ease of illustration, the steps below are enumerated. It will be understood by a skilled person that the method need not be performed in order implied by the enumerations.

At step 210, a user presses on an eject button of a hard drive carrier attempting to disengage a hard disk drive (HDD). At step 220, the controller fetches RAID data from the RAID controller. In this embodiment, the RAID data comprises information of the plurality of drives which are members of the RAID and a RAID level.

At step 230, the fetched RAID data is used to determine if the HDD that the user attempts to disengage belongs to the RAID. If the determination is negative, the controller allows release of the latch 14 such that the HDD 10 may be ejected from the server 1 at step 240. If it is determined that the HDD 10 is a member drive of the RAID, the controller is configured to determine whether the HDD 10 is a healthy or a faulty drive at step 250.

If the HDD 10 is faulty, the disengagement of the HDD 10 is granted, for example, to allow replacement of the drive at step 260. If the HDD 10 is healthy, a fault tolerance state of the RAID is assessed by determining an array redundancy based on the RAID data at step 270.

Typically, the RAID data comprises a working state of each member drive. The working state of the drive component may be indicative of the drive component being in one or more of the following conditions: (i) healthy, (ii) faulty and (iii) during data reconstruction such as during a rebuild mode for data redundancy. Detailed algorithm of this step will now be described below with reference to FIG. 6.

Figure 6:
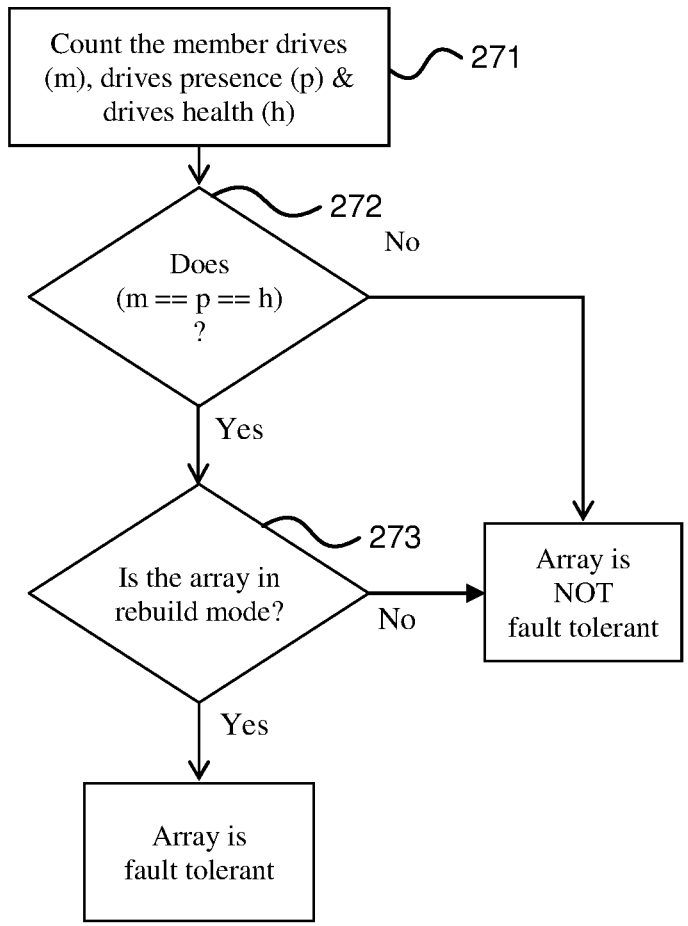
FIG. 6 is a schematic flow chart diagram illustrating an exemplary algorithm for determining a fault tolerance state of a RAID 5.

Referring to FIG. 6, at step 271, the number of member drives, m, of the RAID 5 is determined based on the RAID data provided by the RAID controller. The number of drives which are present, p, and the number of drives which are healthy, h, are similarly determined based on the RAID data.

At step 272, the control algorithm determines if the numbers of member drives (m), drives which are present (p) and drives which are healthy (h) match. As illustrated by FIG. 2, a RAID 5 has a fault tolerance of one, that is, the RAID would fail if there are two or more drives in the RAID are absent and/or faulty. In this case, if the values of m, p and h are not equal, it means that there is at least one drive which is absent and/or faulty. In other words, the RAID has no extra protection, so no further drive should be removed from the RAID. Accordingly, in this case, the RAID is not fault tolerant (i.e. disengaging any remaining member drive of the RAID would cause the RAID to fail).

On the other hand, if the values of m, p and h are equal, the controller uses the RAID data to determine if the RAID is in a rebuild (i.e. data reconstruction) mode at step 273. Typically, after a faulty drive is replaced, it may take several hours to rebuild the array redundancy, during which the RAID is still vulnerable and no drive should be removed until the rebuild is completed. Therefore, if the determination at step 273 is positive, there is no redundant drive in the RAID and thus the RAID is not fault tolerant. On the other hand, if it is determined that the RAID is not in a rebuild mode, then the RAID is fault tolerant. This means that the HDD 10 may be allowed disengaged from the server 1 without compromising the integrity of the RAID and the stored data.

Note that FIG. 6 illustrates an exemplary algorithm for determining a fault tolerance state of a RAID 5. A skilled person would appreciate that there are other possible algorithms for determining whether a RAID 5 is fault tolerant. In addition, a skilled person would appreciate that there may be different algorithms for RAID of different levels.

In a variant, the server 1 may have two, three or more RAID. In one example, if it is determined that the drive component which the user requests to disengage does not belong to any one of the RAID, the drive component may be allowed to be disengaged from the server 1. In another example, the method may allow disengagement of the drive component 10 if it is determined that the drive component 10 as long as it does not belong to a particular, pre-defined RAID.

If the RAID is determined to be not fault tolerant, the latch is disabled at step 280 (i.e. instead of being released) thereby preventing the HDD 10 from being disengaged from the server 1. In this example, an alert is generated to inform the user of that the HDD 10 is locked. The alert may also inform the user of the remaining member drives of the RAID which are locked or will be locked.

If the RAID is determined to be fault tolerant, the latch is released to allow ejection of the HDD 10 at step 260. Optionally, the alert informs the user of all other member-drives of the RAID which will be locked, for example, due to the removal of the present HDD 10. The alert may be in a form of a visual indicator such as a LED light displayed for identifying the drives, as will be described below.

Figure 7A:
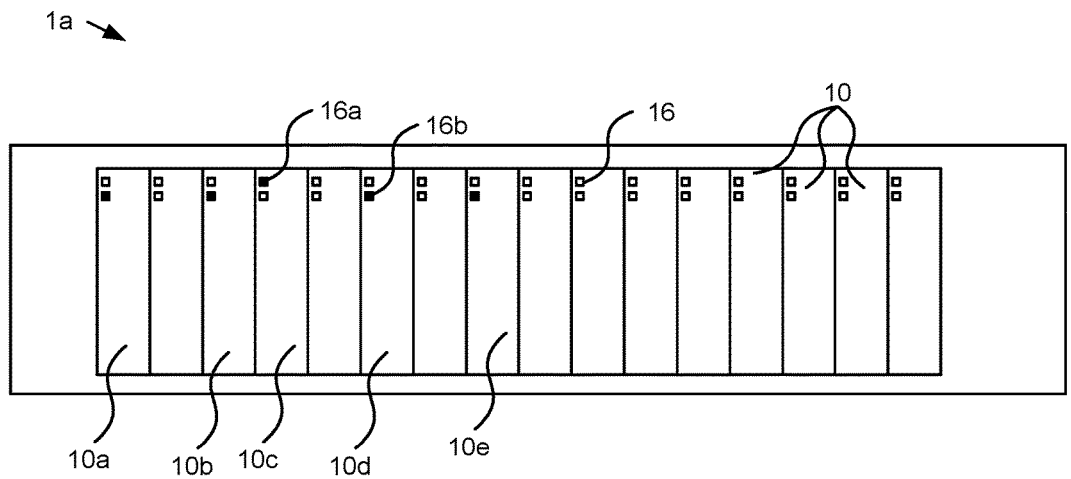
FIG. 7A is a schematic block diagram illustrating one embodiment of a multiple-drive storage system with visual indicator units.
Figure 7B:
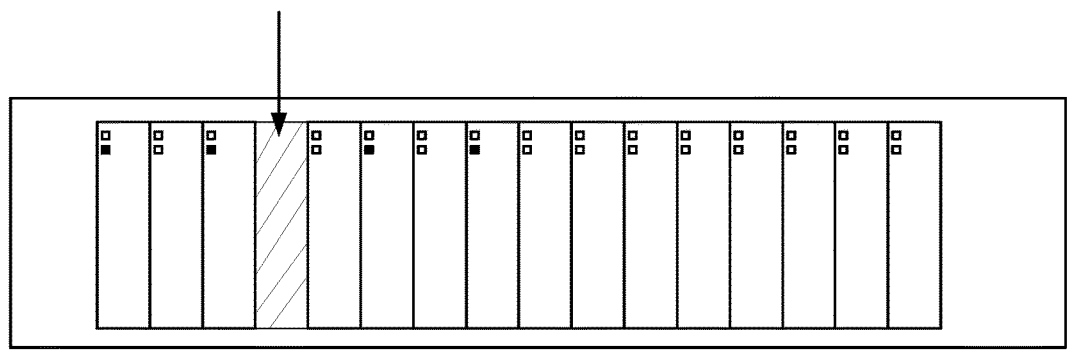
FIG. 7B is a schematic block diagram illustrating the multiple-drive storage system of FIG. 7A with a drive component removed.

As shown in FIG. 7A and FIG. 7B, the server 1a has a plurality of hard disk drives (HDD) 10. Each of them has a visual indicator unit 16 which may be activated to display visual signals to the user. For example, the visual indicator units 16 may be activated to identify of member drives belonging to a same multiple-drive storage system.

In this embodiment, hard disk drives (HDDs) 10a, 10b, 10c, 10d, 10e forms a RAID of level 5 (i.e. RAID 5). In this example, the user attempts to remove the HDD 10c. The RAID 5 is determined to be fault tolerant, so the HDD 10c is allowed to be removed from the RAID 5. As shown in FIG. 7A, the visual indicator unit 16 of the HDD 10c displays a first visual signal 16a (e.g. a green LED light) to inform the user of the successful request. At the same time, the visual indicators 16 on the other member drives 10a, 10b, 10d, 10e of the RAID 5, display a second visual signal 16b (e.g. a yellow and/or flashing LED light) indicating that RAID 5 is no longer fault tolerant and its member drives HDDs 10a, 10b, 10d, 10e are now locked. The first and second visual signals may be displayed concurrently.

In another example, if the disengagement of the HDD 10c is disallowed, for example, due to the HDD 10b being detected as a faulty drive, the visual indicator unit 16 of the HDD 10c may similarly display a yellow and/or flashing LED light (not shown). The visual indicators 16 on the remaining working drives HDDs 10a, 10d, 10e display the yellow and/or flashing LED light to indicate that all of the four HDDs 10a, 10c, 10d, 10e are locked. The visual indicators may be displayed concurrently. Optionally, another visual signal may be displayed for the faulty drive HDD 10b of the RAID to inform the user that HDD 10b is faulty and it should be replaced, instead of the HDD 10c.

As shown in FIG. 7B, following the removal of the HDD 10c from the RAID, the RAID is no long fault tolerant. Accordingly, a request of disengaging any one of the other member drives 10a, 10b, 10d, 10e will be denied and the second visual signal identifying theses drives are displayed to the user.

Figure 8:
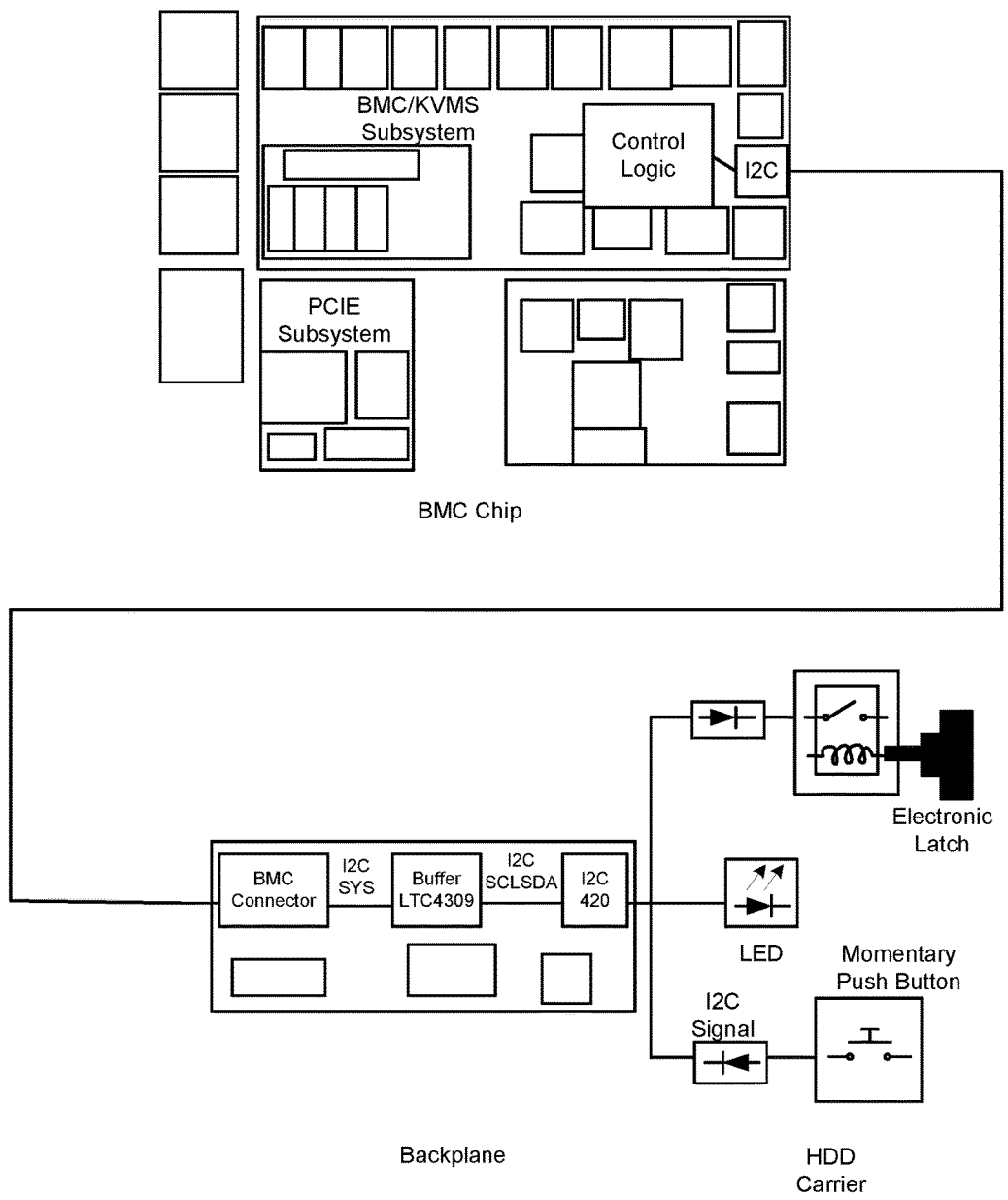
FIG. 8 is a schematic block diagram illustrating one embodiment of a controller for controlling a latch of a computing device of a multiple-drive storage system.

FIG. 8 illustrates an exemplary implementation of a controller according to one embodiment. In particular, the control algorithms may be integrated to a baseboard management controller (BMC) of the server 1. As will be understood by a skilled person, the BMC chip may be configured to digitally control HDD 10 carriers through the backplane so as to perform an embodiment of the present disclosure.

Figure 9:
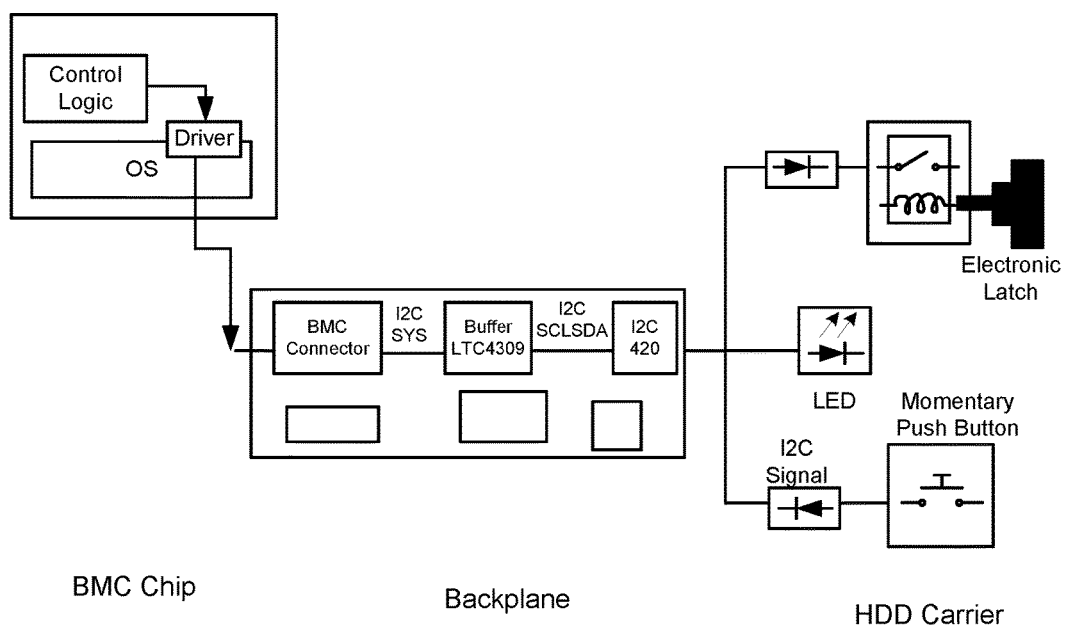
FIG. 9 is a schematic block diagram illustrating another embodiment of a controller for controlling a latch of a computing device of a multiple-drive storage system.

FIG. 9 illustrates another implementation of a controller. In particular, the controller may be implemented as a software application configured to run on a server's operating system ("OS"). In particular, the control algorithm may be stored by the server's secondary storage device and is operative by the server processor to similarly control the HDD 10 carriers via the backplane.

In yet another variant, it is envisaged that the control algorithms may be performed by the RAID controller itself, or that of the multiple-drive storage system.

Whilst the foregoing description has described exemplary embodiments, it will be understood by those skilled in the art that many variations of the embodiment can be made within the scope and spirit of the present embodiments. For example, in the method 200 illustrated above, the step 230 is performed before step 250. In a variant, it is envisaged that a determination as to whether the HDD 10 is faulty may be made before determining whether the HDD 10 is a member drive of the RAID. In another variant, it is envisaged that step 250 maybe omitted and the control algorithm instead determines a fault tolerance state of the RAID 5 by checking if any one of the remaining member drives is faulty. If so, the RAID 5 will be determined as not fault tolerant. Otherwise, the HDD 10 may be allowed to be disengaged from the server 1.

Embodiments may be practiced in other specific forms. The described embodiments are to be considered in all respects only as illustrative and not restrictive. The scope of the embodiments is, therefore, indicated by the appended claims rather than by the foregoing description. All changes which come within the meaning and range of equivalency of the claims are to be embraced within their scope.

What is claimed is:

1. A method comprising:
   detecting a user input request to disengage a drive component from a computing device, the computing device comprising a multiple-drive storage system having a plurality of drive components forming a single logical unit;
   determining whether or not disengaging the drive component would cause failure of the multiple-drive storage system by determining if the drive component belongs to the plurality of drive components of the multiple-drive storage system and determining a fault tolerance state of the multiple-drive storage system;
   disallowing disengagement of the drive component from the computing device in response to determining that disengaging the drive component would cause failure of the multiple-drive storage system; and
   allowing disengagement of the drive component from the computing device in response to determining one or more of that disengaging the drive component would not cause failure of the multiple-drive storage system and that the drive component does not belong to the plurality of drive components of the multiple-drive storage system.

2. The method of claim 1, further comprising detecting a working state of the drive component and using the working state of the drive component to determine if disengaging the drive component would cause failure of the multiple-drive storage system.

3. The method of claim 2, wherein the working state of the drive component is indicative of the drive component being in at least one of the following conditions: (i) healthy, (ii) faulty, and (iii) during data reconstruction.

4. The method of claim 1, further comprising activating visual indicator units of the respective drive components of the plurality of drive components of multiple-drive storage system.

5. The method of claim 1, wherein the computing device comprises a plurality of multiple-drive storage systems, each multiple-drive storage system comprising a plurality of drive components forming a single logical unit, the method further comprising:
   determining if the drive component belongs to the plurality of drive components of any said multiple-drive storage system; and
   disengaging the drive component from the computing device in response to determining that the drive component does not belong to the plurality of drive components of any said multiple-drive storage system.

6. The method of claim 1, wherein the computing device comprises a locking mechanism configured to secure engagement between the drive component and the computing device, wherein allowing disengagement of the drive component from the computing device comprises disabling the locking mechanism.

7. The method of claim 1, wherein the drive component comprises a visual indicator unit, the method further comprising activating the visual indicator unit of the drive component.

8. The method of claim 7, further comprising causing:
   a first visual indicator of the visual indicator unit to be displayed in response to disengagement of the drive component being allowed; and
   a second visual indicator of the visual indicator unit to be displayed in response to disengagement of the drive component being disallowed.

9. The method of claim 1, wherein the multiple-drive storage system is a redundant array of independent disks ("RAID").

10. The method of claim 9, further comprising:
    obtaining RAID data from a RAID controller, said RAID data comprising a working state for each drive component of the RAID and a RAID level; and
    determining an array redundancy of the RAID based on the RAID data.

11. The method according to claim 1, wherein the method is implemented by a software application configured to run on an operating system of the computing device.

12. A controller configured to:
    detect user input request to disengage a drive component from a computing device, the computing device comprising a multiple-drive storage system having a plurality of drive components forming a single logical unit;
    determine whether or not disengaging the drive component would cause failure of the multiple-drive storage system by determining if the drive component belongs to the plurality of drive components of the multiple-drive storage system and determining a fault tolerance state of the multiple-drive storage system;
    disallow disengagement of the drive component from the computing device in response to determining that disengaging the drive component would cause failure of the multiple-drive storage system; and
    allow disengagement of the drive component from the computing device otherwise in response to determining one or more of that disengaging the drive component would not cause failure of the multiple-drive storage system and that the drive component does not belong to the plurality of drive components of the multiple-drive storage system.

13. The controller of claim 12, wherein the controller is a baseboard management controller ("BMC") of the computing device.

14. The controller of claim 12, wherein the multiple-drive storage system is a redundant array of independent disks ("RAID") and the controller is a RAID controller.

15. A computing device comprising:
a multiple drive storage system having a plurality of drive components forming a single logical unit;
a processor, configured to:
  detect user input request to disengage a drive component from a computing device;
  determine whether or not disengaging the drive component would cause failure of the multiple-drive storage system by determining if the drive component belongs to the plurality of drive components of the multiple-drive storage system and determining a fault tolerance state of the multiple-drive storage system;
  disallow disengagement of the drive component from the computing device in response to determining that disengaging the drive component would cause failure of the multiple-drive storage system; and
  allow disengagement of the drive component from the computing device in response to determining one or more of that disengaging the drive component would not cause failure of the multiple-drive storage system and that the drive component does not belong to the plurality of drive components of the multiple-drive storage system.

16. The computing device of claim 15, wherein the multiple-drive storage system is a redundant array of independent disks ("RAID").

17. The computing device of claim 15, wherein the plurality of drive components comprise a visual indicator unit configured display visual indicators to identify the drive component as belonging to the plurality of drive components of the multiple-drive storage system.

* * * * *